(12) United States Patent
Kwag et al.

(10) Patent No.: US 8,945,746 B2
(45) Date of Patent: Feb. 3, 2015

(54) BATTERY PACK WITH IMPROVED HEAT DISSIPATION EFFICIENCY

(75) Inventors: No-Hyun Kwag, Suwon-si (KR); Kyung-Won Seo, Suwon-si (KR); Jeong-Deok Byun, Suwon-si (KR); Watson Doh, Suwon-si (KR); Jin-Hong An, Suwon-si (KR); Jung-Yub Han, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 605 days.

(21) Appl. No.: 12/826,437

(22) Filed: Jun. 29, 2010

(65) Prior Publication Data

US 2011/0039142 A1 Feb. 17, 2011

Related U.S. Application Data

(60) Provisional application No. 61/233,296, filed on Aug. 12, 2009.

(51) Int. Cl.
*H01M 2/10* (2006.01)
*H01M 10/50* (2006.01)
*H01M 2/20* (2006.01)
(Continued)

(52) U.S. Cl.
CPC ............ *H01M 2/105* (2013.01); *H01M 2/1077* (2013.01); *H01M 2/202* (2013.01); *H01M 10/5004* (2013.01); *H01M 10/503* (2013.01);
(Continued)

(58) Field of Classification Search
USPC .......................................... 429/99, 120–347
See application file for complete search history.

(56) References Cited

U.S. PATENT DOCUMENTS

2001/0046624 A1* 11/2001 Goto et al. ...................... 429/99
2005/0221176 A1 10/2005 Kim
(Continued)

FOREIGN PATENT DOCUMENTS

JP 2005285758 10/2005
JP 2008-047488 2/2008
(Continued)

OTHER PUBLICATIONS

Korean Notice of Allowance issued by KIPO on Jun. 8, 2012, corresponding to KR10-2010-0069600 and Request for Entry attached herewith.

(Continued)

*Primary Examiner* — Kenneth Douyette
*Assistant Examiner* — James Lee
(74) *Attorney, Agent, or Firm* — Robert E. Bushnell, Esq.

(57) ABSTRACT

Provided is a battery pack with improved heat dissipation efficiency. The battery pack includes a holder case, and a plurality of batteries disposed inside the holder case. The holder case includes a plurality of ribs disposed inside the holder case. Each of the ribs has a column extending in a direction substantially parallel to a side surface of the holder case, and each of the batteries is accommodated between the columns of the ribs. The column has a heat dissipation hole therein extending along the extension direction of the column. An air flow is formed through the heat dissipation hole, and heat generated during a charge and/or discharge operation dissipates through the air flow in the heat dissipation hole. A portion of the columns are separated from each other forming a gap. The heat generated from the batteries also dissipates through this gap.

10 Claims, 6 Drawing Sheets

(51) Int. Cl.
  *H01M 10/613*   (2014.01)
  *H01M 10/643*   (2014.01)
  *H01M 10/6557*  (2014.01)
  *H01M 10/6562*  (2014.01)
  *H01M 10/6563*  (2014.01)

(52) U.S. Cl.
  CPC ...... *H01M 10/5059* (2013.01); *H01M 10/5065* (2013.01); *H01M 10/5067* (2013.01)
  USPC .............................. 429/99; 429/120; 429/148

(56) References Cited

U.S. PATENT DOCUMENTS

| | | |
|---|---|---|
| 2007/0148536 A1 | 6/2007 | Kang et al. |
| 2009/0123819 A1 | 5/2009 | Kim |
| 2010/0047676 A1* | 2/2010 | Park et al. ................... 429/93 |

FOREIGN PATENT DOCUMENTS

| | | |
|---|---|---|
| JP | 2008-47488 A | 2/2008 |
| JP | 2008-166209 | 7/2008 |
| JP | 2008-166209 A | 7/2008 |
| JP | 2009518805 | 5/2009 |
| KR | 10-2005-0107169 | 11/2005 |
| KR | 10-2008-0013040 A | 2/2008 |
| KR | 10-2009-0048861 A | 5/2009 |
| WO | 2007066919 A | 6/2007 |
| WO | 2007075019 A | 7/2007 |
| WO | 2008018714 A | 2/2008 |

OTHER PUBLICATIONS

Japanese Office Action issued on Oct. 16, 2012 by JPO in connection with Japanese Patent Application Serial No. 2010-176630, which claims priority from the present application and Request for Entry of the Accompanying Office Action attached herewith.

European Office Action issued by European Patent Office on Mar. 20, 2012 in connection with European Patent Application Serial No. 10251440.3, which also claims U.S. Appl. No. 61/233,296 as its priority document.

European Office Action dated Apr. 9, 2013 issued by EPO in connection with European Patent Application No. 10251440.3.

Chinese Office Action issued by Chinese Patent Office on Nov. 11, 2013 in connection with Chinese Patent Application No. 201010253569.0 which also claims priority from the present application.

Chinese Office Action issued by Chinese Patent Office on Apr. 17, 2014 in connection with Chinese Patent Application No. 201010253569.0 which also claims priority from the present application.

* cited by examiner

BATTERY PACK WITH IMPROVED HEAT DISSIPATION EFFICIENCY

CLAIM OF PRIORITY

This application makes reference to, incorporates the same herein, and claims all benefits accruing under 35 U.S.C. §119 from a provisional application earlier filed in the U.S. Patent & Trademark Office on Aug. 12, 2009 and there duly assigned Ser. No. 61/233,296.

BACKGROUND OF THE INVENTION

1. Field of the Invention

One or more embodiments of the present invention relate to a battery pack, and more particularly, to a battery pack with improved heat dissipation efficiency.

2. Description of the Related Art

As technology of mobile devices has been remarkably developed and the demand for mobile devices increases, the demand for secondary batteries as an energy source is rapidly increased. Depending on types of external devices in which batteries are used, such secondary batteries are used in the form of a single battery or in the form of a battery pack in which a plurality of batteries are electrically connected and are packed as a one unit.

Small-sized devices such as mobile phones operate with an output and capacity of a single battery for a predetermined amount of time. On the other hand, battery packs are usually used in medium or large size devices such as mobile devices including notebook computers or camcorders, motor-operated bicycles requiring high power, motor scooters, electric motor vehicles, and hybrid electric motor vehicles that need to be driven with high power for a long time. These medium or large size devices require higher output power and capacity of batteries. Battery packs are capable of increasing an output voltage or an output current according to the number of batteries embedded in the battery packs. In such battery packs, a plurality of batteries are embedded therein, and a charge and/or discharge operation is performed with a large amount of current. Thus, appropriate heat dissipation measures for preventing the batteries from being overheated are urgently needed.

SUMMARY OF THE INVENTION

One or more embodiments of the present invention include a battery pack with improved heat dissipation efficiency.

Additional aspects will be set forth in part in the description which follows and, in part, will be apparent from the description, or may be learned by practice of the presented embodiments.

According to one or more embodiments of the present invention, there is provided a battery pack including a holder case, and a plurality of batteries disposed inside the holder case. The holder case includes a plurality of ribs disposed inside the holder case. Each of the ribs includes a column extending in a direction substantially parallel to a side surface of the holder case. Each of the batteries is accommodated between the columns of the ribs, and the column has a heat dissipation hole therein extending along the extension direction of the column.

The each of the ribs further may include a first fin extending in a first direction from the column and a second fin extending in a second direction from the column. Each of the first and the second direction is substantially perpendicular to the extension direction of the column. An end of the column may be dispose around a back surface of the holder case, and the column may extend towards a front surface of the holder case. Each of the back and front surfaces may be substantially perpendicular to the side surface of the holder case. The first and the second fins may be disposed around the end of the column. The first fins of the ribs may be connected to each other, and the second fins of the ribs may be connected to each other.

A first gap may be formed between two of columns of the ribs.

The battery pack may further include a lead plate disposed on a front or back surface of the holder case. The lead plate electrically connects one of the batteries to another of the batteries.

The column may further include at least one sub-column that extends in the extension direction of the column. The column may include more than one sub-columns, and a second gap is formed between two of the more than one sub-columns. The heat dissipation hole may be surrounded by at least two of the more than one sub-columns.

The battery pack may further include a frame for forming an outline of the holder case, and at least one of the batteries may include a secondary battery.

According to another aspect of the present invention, there is provided a battery pack including a holder case, and a plurality of batteries disposed inside the holder case. The holder case includes a plurality of ribs disposed inside the holder case. Each of the ribs includes a column extending in a direction substantially parallel to a side surface of the holder case. Each of the batteries is accommodated between the columns of the ribs. The column has a heat dissipation channel formed therein. Heat radiated from the batteries dissipates through the heat dissipation channel.

The heat dissipation channel may include a heat dissipation hole extending along the extension direction of the column. The column may include sub-columns, and the heat dissipation channel may include a second gap formed between two of the sub-columns. The column may further include a heat dissipation hole extending along the extension direction of the column, and the heat dissipation hole being surrounded by at least two of the sub-columns.

The each of the ribs may further include a first fin extending in a first direction from the column and a second fin extending in a second direction from the column.

A first gap may be formed between two of columns of the ribs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 1:
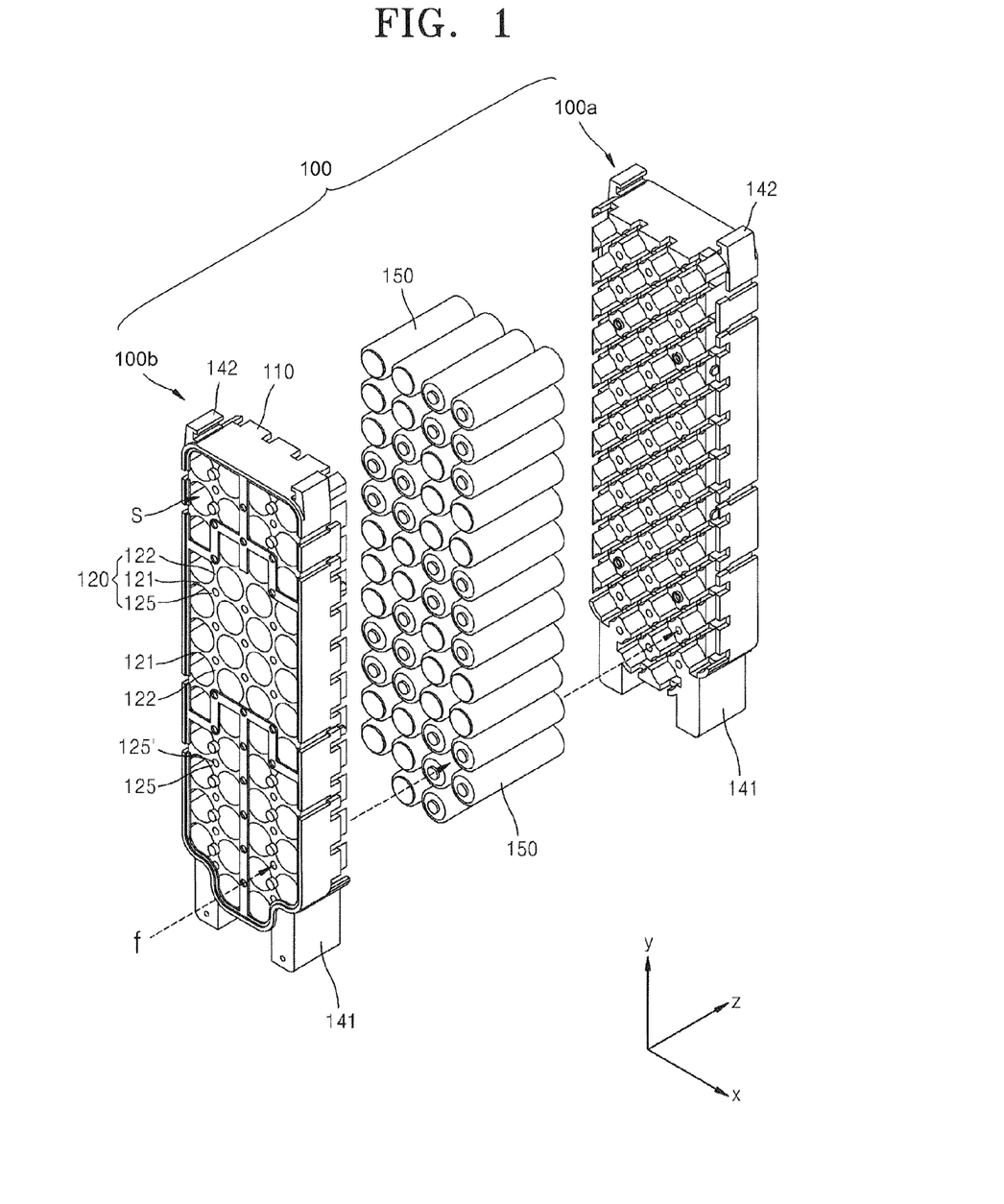
FIG. 1 is an exploded perspective view of a battery pack according to an embodiment of the present invention.

FIG. 1 is an exploded perspective view of a battery pack according to an embodiment of the present invention. The battery pack according to the present embodiment includes a holder case 100, which may include a first holder case 100a and a second holder case 100b, and a plurality of batteries 150 that are accommodated in the holder case 100. The first and second holder cases 100a and 100b face each other and are assembled together. Even though FIG. 1 shows that a holder case 100 has a first and second holder cases 100a and 100b, the holder case 100 may be made as a single member without the first and second holder cases.

The shape of the first and second holder cases 100a and 100b may be symmetrical, and the first and second holder cases 100a and 100b forms a pair. The first holder case 100a is combined with the second holder case 100b in a z-direction, forming a holder case 100, in a manner that the plurality of batteries 150 is accommodated inside the holder case 100. Throughout the present specification, an inner surface of the first holder case 100a is referred to as a surface that faces the second holder case 100b, and an outer surface of the first holder case 100a is referred to as a surface that turns away from the second holder case 100b. The same definitions are applied to the second holder case 100b. The portions of the first and second holder cases 100a and 100b, which accommodate the batteries 150, may be symmetrical with each other, but combination portions of the first and second holder cases 100a and 100b may have complementary members, such as male and female members, so that they may be engaged with one another.

Each of the first and second holder cases 100a and 100b may include a frame 110 that forms an outline of the each of the holder cases. The holder case 100 includes a plurality of ribs 120 that separate the batteries 150 from one another. The frame 110 may form side surfaces of the holder case 100, and the ribs 120 may be disposed inside a space surrounded by the frame 110. The ribs 120 define a plurality of cells S in which each of batteries 150 is accommodated so that the batteries 150 embedded in the battery pack may be arranged in a plurality of columns at regular intervals. Each cell S may have a form of a hole that is disposed inside the holder case 100. For example, the ribs 120 may provide cylindrical support surfaces so as to encompass the circumferences of cylindrical type batteries 150.

Each of the ribs 120 includes a column 125 extending in a direction along z-axis. Each of the batteries 150 is disposed between the columns of the ribs. The each of the ribs 120 further includes a first fin 121 that extends in a first direction along x-axis from the column 125, and a second fin 122 that extends in a second direction along y-axis from the column 125. The extension direction of the column 125 (z-axis) may be substantially perpendicular to the first direction (x-axis) and the second direction (y-axis). The first and second ribs 121 and 122 join together through the column 125.

Figure 3:
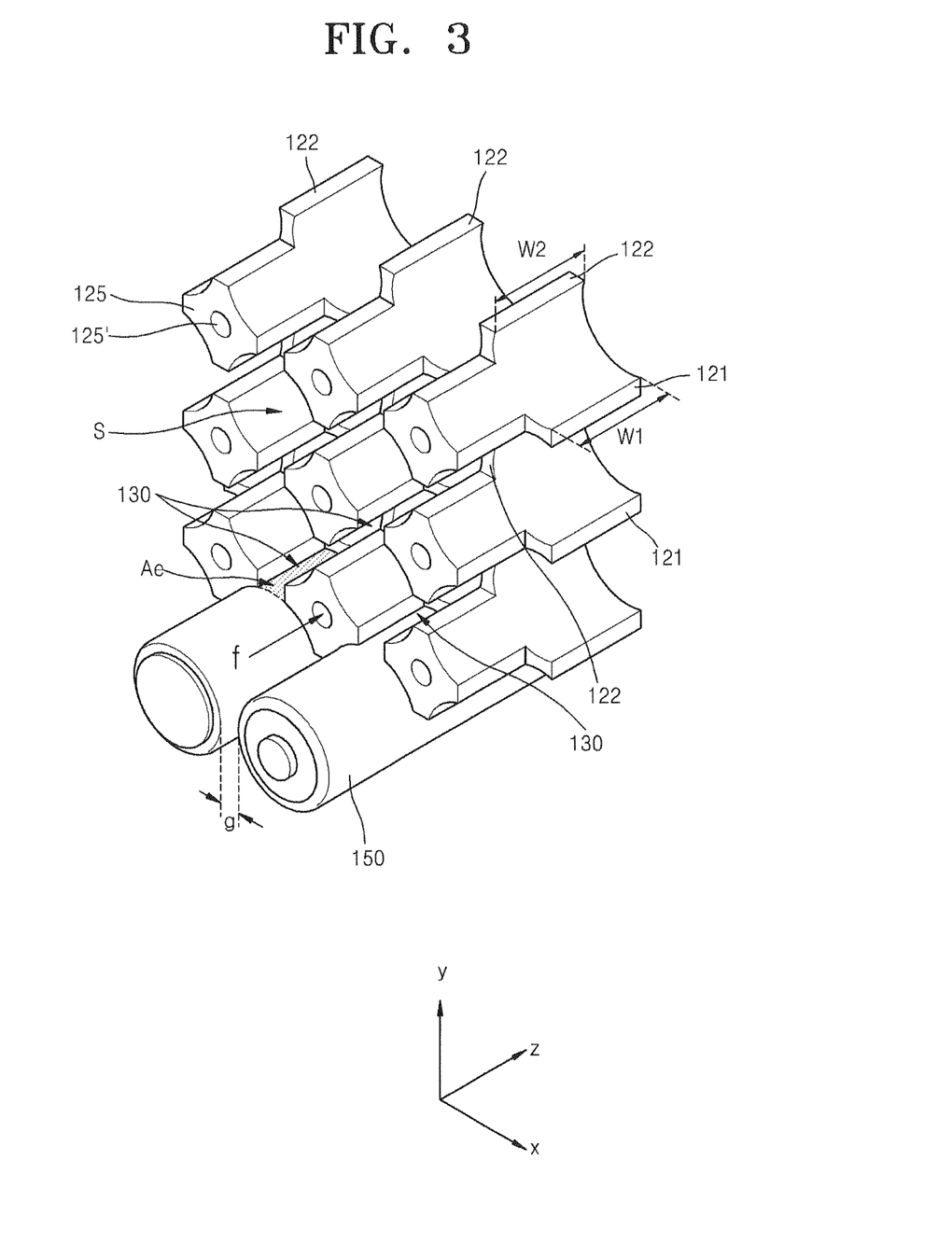
FIG. 3 is an enlarged perspective view of main portions of the holder case shown in FIG. 2.

A heat dissipation hole 125', which is an air path, is formed along the extension direction of the column 125. For example, each heat dissipation hole 125' has a circular cross-sectional shape and perforates each column 125 throughout the overall length of the column 125. As shown in FIG. 3, an air flow f in the heat dissipation hole 125' proceeds in the spaces between the neighboring batteries 150, and heat generated during a charge and/or discharge operation is dissipated by the air flow f in the heat dissipation hole 125'. The air flow f induced along the heat dissipation hole 125' may be generated naturally or may be initiated by external wind, and may allow heat dissipation to be performed by natural or forced convection. For example, a cooling fan (not shown) that provides cooling air into the heat dissipation hole 125' may be disposed outside the holder case 100.

The first fin 121 extends in the first direction (x-direction) and is connected to a portion of the column 125 that faces the first direction (x-direction). The second fin 122 extends in the second direction (y-direction) and is connected to a portion of the column 125 facing the second direction (y-direction). The first fins 121 of the neighboring columns 125 are connected or contact each other, and the second fins 122 of the neighboring columns 125 are connected or contact each other. Accordingly, neighboring columns 125 are supported via the first and second fins 121 and 122.

As the first and second fins 121 and 122 are protruding members, which protrude from the column 125 in directions substantially perpendicular to the extension direction of the column 125, the cylindrical cell S that supports the circumference of each of the batteries 150 may be defined between columns 125. Accordingly, contact between the neighboring batteries 150 may be prevented, and consecutive heating of the neighboring batteries 150 may be prevented even in an abnormal operating environment in which a certain battery 150 is overheated. For example, the holder cases 100 may be formed as a single body and may be formed of plastics having an excellent processing property and an excellent adiabatic property.

The columns 125 are connected to one another via the first and second fins 121 and 122 and thus provide structural rigidity of the holder case 100. On the other hand, inside the holder case 100, the columns 125 are separated from each other by the first and second fins 121 and 122 so that a portion of the surface of the batteries 150 is directly exposed to the low temperature air (cooling or ambient air). This structure will be described in detail.

Figure 2:
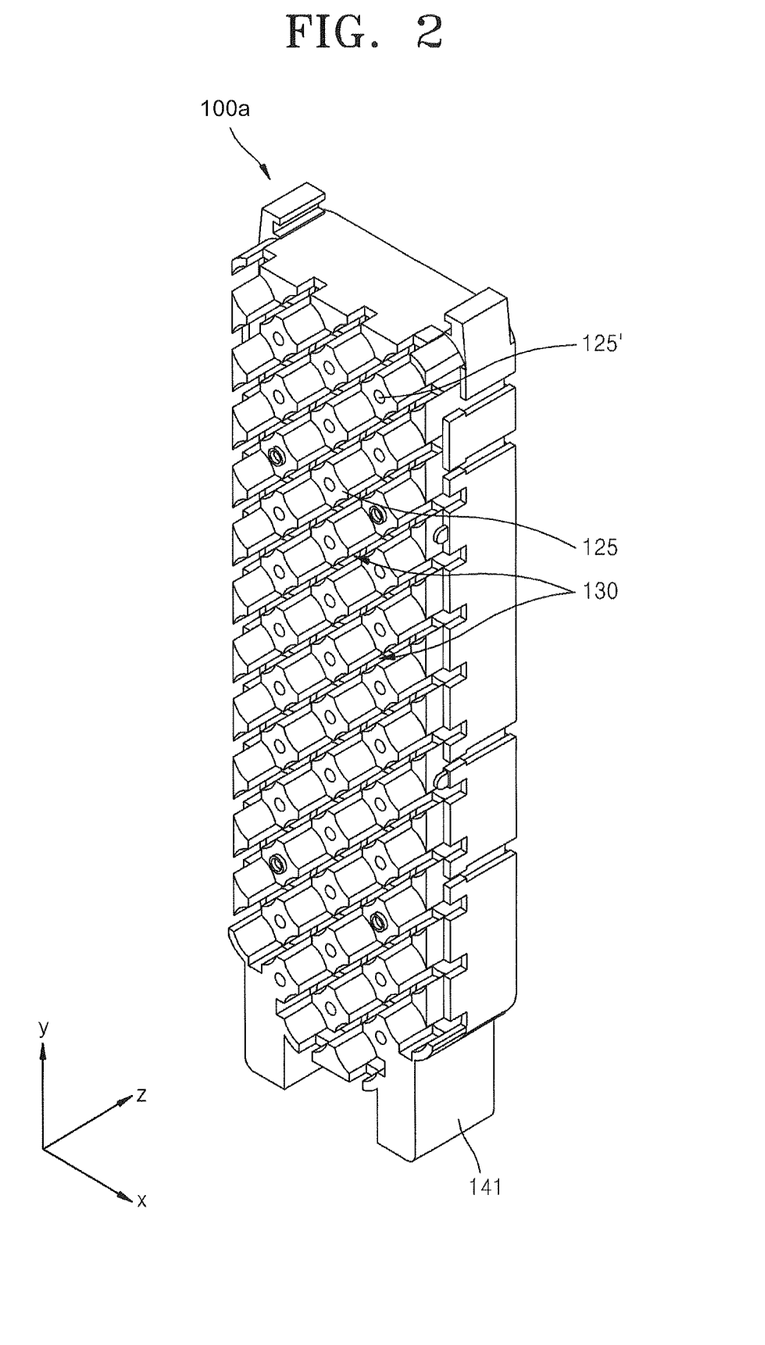
FIG. 2 is a perspective view of a holder case of the battery pack shown in FIG. 1.

FIG. 2 is a perspective view of a first holder case of the battery pack shown in FIG. 1, and FIG. 3 is an enlarged perspective view of main portions of the first holder case shown in FIG. 2. Referring to FIGS. 2 and 3, the columns 125 are arranged in two dimensional arrays on a surface defined by the first and second directions (x- and y-directions), and a first gap (an air gap) 130, through which the surface of the battery 150 is exposed, is formed between the columns 125. The first gap 130 may be formed between portions of the columns on which the first and second fins 121 and 122 are not formed (shown in FIG. 3), and these portions of the columns 125 are separated from one another by the first gap 130 formed therebetween, and are isolated from each other.

A surface Ae of the battery 150 is exposed through the first gap 130, and directly contacts the low temperature air (cooling or ambient air). Accordingly, heat may dissipate by convection, and heat accumulation of the batteries 150 during a charge and/or discharge operation may be prevented. The first and second fins 121 and 122 may be disposed around an end of the column 125 as shown in FIG. 3, and support the circumference of the batteries 150. Each of the first and second fins 121 and 122 has a length that is a size of the fin defined along the extension direction of the column 125 (z-axis). As shown in FIG. 3, the first and second fins 121 and 122 proceed along the extension direction of the column 125 by a first length W1 and a second length W2, respectively, from the end of the column 125. The first and second lengths W1 and W2 may be the same or may be different. The end of the column 125 may be disposed around a back surface of the holder case, and the column may extend towards a front surface of the holder case. Herein, the front and back surfaces of the holder case 100 are defined as surfaces of the holder case 100 substantially perpendicular to the z-axis. In this case, as shown in FIG. 3, the first and second ribs 121 and 122 extend into the inside of the holder case 100.

The lengths W1 and W2 of the first and second fins 121 and 122 determine the size of the exposed area of the battery 150. In other words, as the lengths W1 and W2 of the first and second fins 121 and 122 are increased, more surface Ae of the battery 150 is covered by the first and second fins 121 and 122 by the increased lengths W1 and W2 of the first and second fins 121 and 122, and thus, the exposed surface Ae of the battery 150 is decreased. On the contrary, if the lengths W1 and W2 of the first and second fins 121 and 122 are decreased, the first gap 130 is increased by the decreased lengths W1 and W2 of the first and second fins 121 and 122, and thus, the exposed surface Ae of the battery 150 is increased. By adjusting the lengths W1 and W2 of the first and second fins 121 and 122, the exposed surface Ae of the battery 150 may be changed. As the exposed surface Ae of the battery 150 is increased, heat dissipation may be expedited. When the exposed surface Ae of the battery 150 is excessively increased, thermal contact between the neighboring batteries 150 may occur, and the neighboring batteries 150 are consecutively heated and deteriorate in an abnormal operating environment in which the certain battery 150 is overheated. Thus, the exposed surface Ae of the battery 150 may be designed to an appropriate size.

A separation gap g between the batteries 150 that are arranged in a designated position at regular intervals may be obtained. When the separation gap g is defined as the shortest distance from a curvature point to another curvature point between the neighboring batteries 150, the separation gap g of at least 2 mm or more may be obtained in view of heat dissipation efficiency. The minimum separation gap g is obtained in this way so that thermal contact between the neighboring batteries 150 may be prevented, consecutive deterioration may be prevented, sufficient air flow in the separation gap g may be obtained, and heat dissipation may be expedited.

A plurality of heat dissipation holes 125' that form an air path are formed along the extension direction of the columns 125. Four batteries 150 are symmetrically disposed around each heat dissipation hole 125', and heat generated in each battery 150 arranged around the heat dissipation hole 125' is dissipated by an air flow f in the heat dissipation hole 125'. Meanwhile, each cell S, in which each battery 150 is accommodated, is defined by the four neighboring columns 125 in the horizontal and vertical directions (x- and y-directions). For example, the lateral surface of the column 125 may be formed so as to encompass the cylindrical battery 150.

Each battery 150 to be accommodated in the holder case 100 may be a secondary battery that may be charged and/or discharged, such as a lithium ion secondary battery having excellent output and capacity. Besides, a nickel-cadmium secondary battery, a nickel-hydrogen secondary battery, a lithium battery, etc. may be used. The batteries 150 are charged or discharged with a large amount of current of 1000 mA or more, for example, 1800 mA. According to a heat dissipation structure that is suggested to prevent temperature increase and deterioration or malfunction caused by a charge and/or discharge operation, heat generated in each battery 150 dissipates via the air flow f of the heat dissipation hole 125'. In this case, the exposed surface Ac of the battery 150 through the first gap 130 formed between the columns 125 directly contacts the air so that heat dissipation may be expedited.

Figure 4:
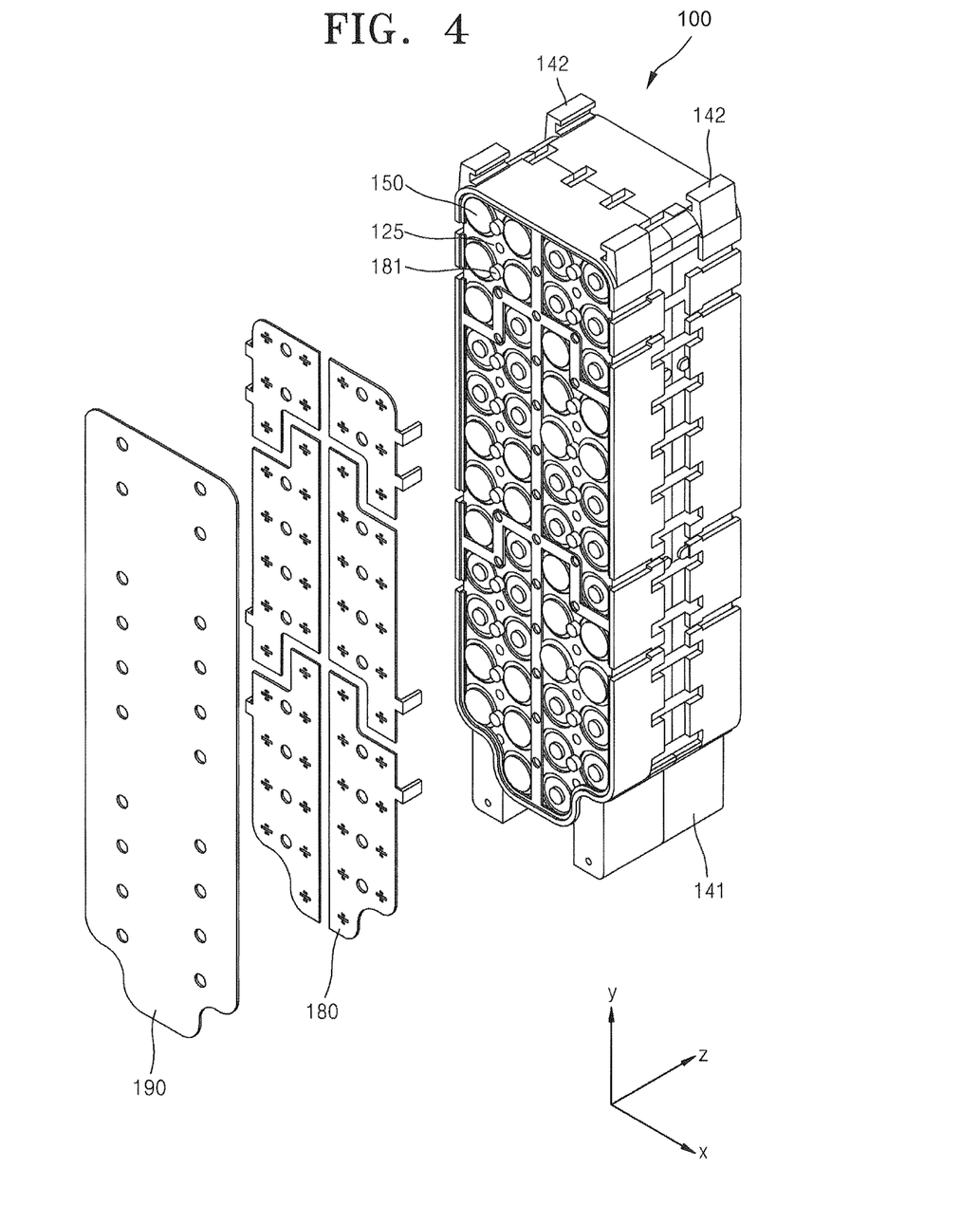
FIG. 4 is a perspective view of an assembled battery pack.

FIG. 4 is a perspective view of an assembled battery pack. Referring to FIG. 4, the first and second holder cases 100a and 100b are assembled to face each other while the batteries 150 are interposed inside the holder cases. In this case, the batteries 150 are disposed in positions of cells S defined in the holder cases 100 at regular intervals. A lead plate 180 is disposed outside the holder case 100 (front or back surface of the holder case 100) and electrically connects the batteries 150 embedded in the battery pack in series and/or in parallel. The lead plate 180 may be inserted in an assembly protrusion 181 that protrudes from the holder case 100. The assembly protrusion 181 may serve as a stopper that prevents the batteries 150 accommodated in the holder case 100 from being pushed out of the holder case 100.

The lead plate 180 connects electrodes of the batteries 150 in series and/or in parallel. For example, as shown in FIG. 4, the lead plate 180 may connect a group of five batteries 150 arranged in rows and columns of upper left block in parallel, may connect another group of five batteries arranged next to the upper left block in parallel, and may connect these two groups of batteries in series. The connection structure of the batteries 150 connected in series and/or in parallel or the number and arrangement of the batteries 150 that constitute parallel blocks may be changed in various configurations. Also, the type of arrangement of the batteries 150 that constitute the battery pack is not limited thereto.

An insulating tape 190 is attached to an outside of the lead plate 180 so that the lead plate 180 may be electrically insulated from an external environment. The battery pack may include a circuit board (not shown) that detects the state of voltage of the battery 150 and controls a charge and/or discharge operation. The circuit board is electrically connected to the lead plate 180 that constitutes a current path, and may be connected to the lead plate 180 via a lead line (not shown) drawn out from the circuit board. The circuit board detects the state of voltage of each battery 150 and provides a charge current via the lead plate 180.

On the other hand, leg members 141 and 142 that support the battery pack in an upright position may be disposed at upper and lower ends of the holder case 100. For example, the leg members 141 and 142 may be disposed at the right and left sides of the holder case 100, and the battery pack may be maintained in a stable upright position by the leg members 141 and 142 disposed in four symmetrical corners of the holder case 100.

Figure 5:
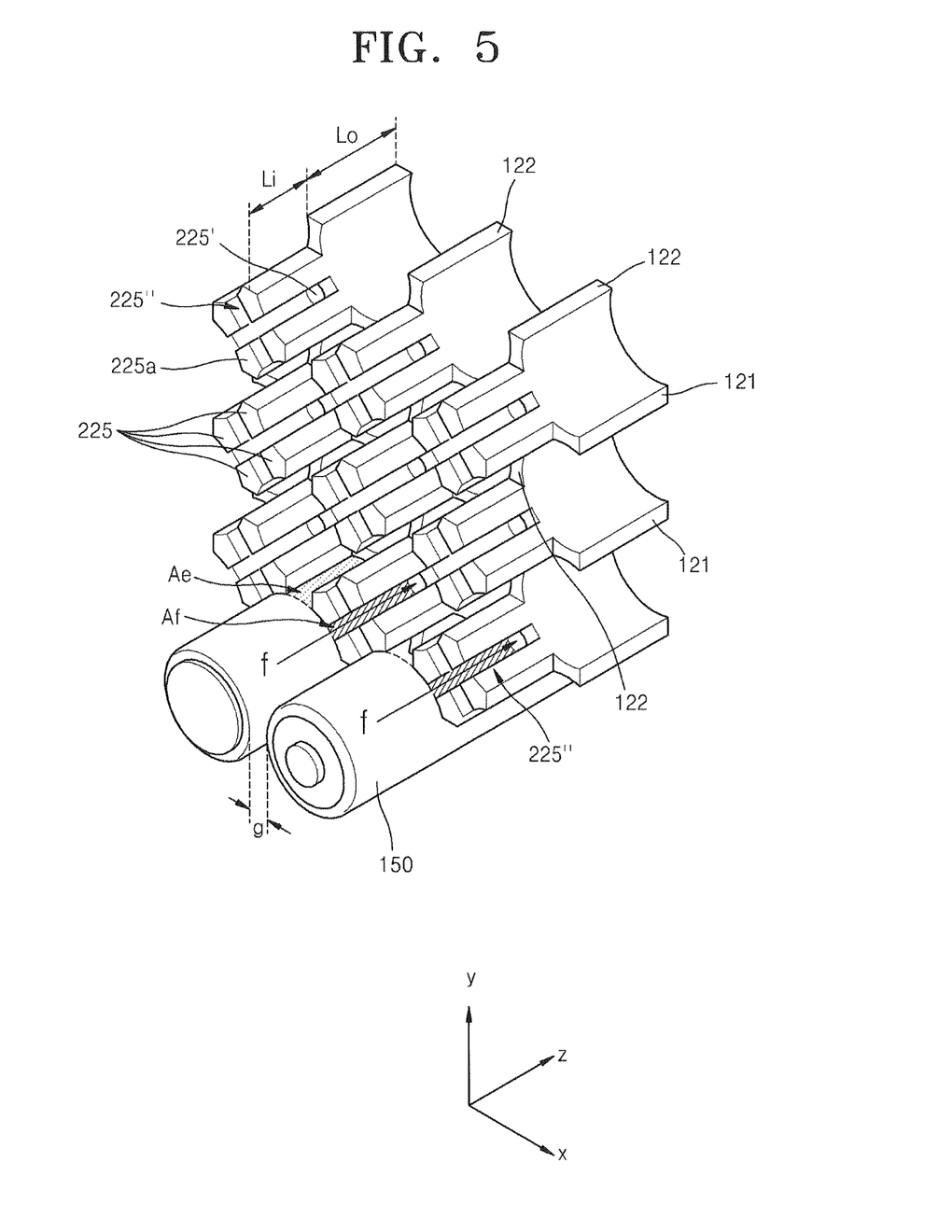
FIG. 5 is a perspective view of main portions of the holder case of FIG. 3 according to a modified embodiment of the present invention.

FIG. 5 is a perspective view of main portions of the holder case of FIG. 3 according to a modified embodiment of the present invention. Referring to FIG. 5, a heat dissipation hole 225' is formed in the center of a column 225, and the column 225 is cut in an extension direction of the column 225 (z-direction) and are divided into sub-columns 225a. For example, a column 225 of FIG. 5 may include four sub-columns 225a that extend in the extension direction of column 225 (z-direction). In this case, sub-columns 225a are separated from each other, and a second gap 225" is formed between two of the sub-columns 225a.

Through the second gap 225", a portion of surface Af of the battery 150 is directly exposed to an air flow f formed in the heat dissipation hole 225'. Accordingly, heat dissipation efficiency may be improved. Heat radiated from the portion of surface Af of the battery 150 may directly dissipate by the air flow f in the heat dissipation hole 225'.

For example, in the holder case shown in FIG. 3, heat radiated from the surface Ae of the battery 150 is transferred to the air flow f via the bodies of the columns 125, because the heat dissipation hole 125' is formed inside the column 125. The columns 125 are heat dissipation medium, through which heat is transferred from the batteries to the heat dissipation holes so that thermal resistance of the heat dissipation medium may be high. In the holder case shown in FIG. 5, the second gaps 225" are additionally formed in the columns 225 including the heat dissipation holes 225' so that heat radiated from the portion of surface Af of the battery 150 may be directly transferred to the air flow f of the heat dissipation hole 225' rather than through the bodies of the columns 225, and heat dissipation efficiency may be improved.

The second gap 225" may be formed throughout the overall length of the column 225 or may also be formed only to a portion of the length of the column 225. For example, the second gap 225" may not be formed at an outside portion Lo of the separation column 225, on which fins are formed, and may be formed only at an inside portion Li of the column 225, in which fins are not formed. In this case, the column 225 may have an undivided hollow shape in its outside portion Lo, and may have a divided shape in which the column 225 is cut in the lengthwise direction and is divided into the four sub-columns 225a in the inside portion Li of the separation column 225. In consideration of heat dissipation efficiency and a mechanical strength of the holder case 100, the outside portion Lo and the inside portion Li of the separation column 225 may be designed to appropriate lengths.

Figure 6:
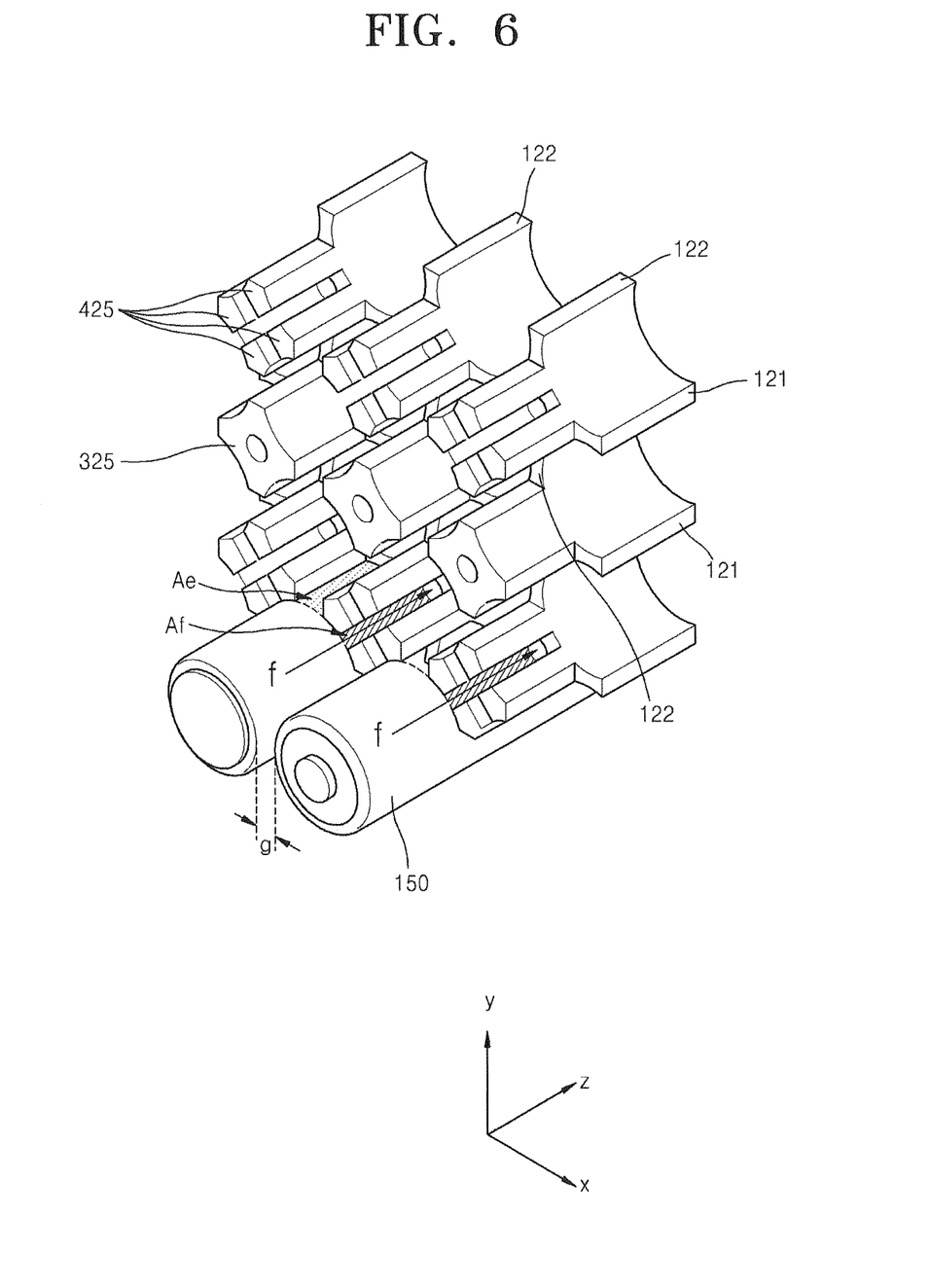
FIG. 6 is an extracted perspective view of main portions of the holder case of FIG. 3 according to another modified embodiment of the present invention.

FIG. 6 is an extracted perspective view of main portions of the holder case of FIG. 3 according to another modified embodiment of the present invention. The holder case of FIG. 6 includes some of ribs including a first column 325 having an undivided hollow shape, and other ribs including a second separation column 425 having a divided shape in which each column 425 is cut in the lengthwise direction and is divided into a few sub-columns. The arrangement and number of the first and second columns 325 and 425 are not limited thereto and may be designed in consideration of the distribution of the quantity of the entire heat of the holder case. The second gap formed between sub-columns or the heat dissipation hole formed in the column is generally referred to as a heat dissipation channel, through which heat generated from the batteries dissipates. Even though drawings show a heat dissipation hole and a second gap, the embodiments are not limited to these types of heat dissipation channels. The holder case may include a column that includes various other types of heat dissipation channels or combinations of the various types of the heat dissipation channels.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
a holder case; and
a plurality of batteries disposed inside the holder case, the holder case comprising:
a plurality of ribs disposed inside the holder case, each of the ribs comprising a column extending in a direction substantially parallel to a side surface of the holder case and a first fin extending in a first direction from the column, the column having a portion on which the first fin is formed, the column having another portion that further extends from the portion of the column along the direction substantially parallel to the side surface of the holder case, a first gap being formed between said another portions of two columns of the rib, the first fin not being formed on said another portion of the column, the first fin of one of the ribs directly contacting the first fin of another one of the ribs, each of the batteries being accommodated between the columns of the ribs, the column having a heat dissipation hole therein extending along the extension direction of the column, the portion of the column, on which the first fin is formed, having an undivided hollow shape with a hollow that forms the heat dissipation hole, said another portion of the column, on which the first fin is not formed, being divided into at least two sub-columns extending along the extension direction of the column, a second gap being formed between adjacent two sub-columns, the heat dissipation hole being surrounded by the sub-columns.

2. The battery pack of claim 1, wherein each of the ribs further comprises a second fin extending in a second direction from the column.

3. The battery pack of claim 2, wherein an end of the column is disposed around a back surface of the holder case, the column extending towards a front surface of the holder case, each of the back and front surfaces being substantially perpendicular to the side surface of the holder case.

4. The battery pack of claim 3, wherein the first and the second fins are disposed around the end of the column.

5. The battery pack of claim 2, wherein the first fins of the ribs are connected to each other, and the second fins of the ribs are connected to each other.

6. The battery pack of claim 2, wherein each of the first and the second direction is substantially perpendicular to the extension direction of the column.

7. The battery pack of claim 1, further comprising a lead plate disposed on a front or back surface of the holder case, the lead plate electrically connecting one of the batteries to another of the batteries.

8. The battery pack of claim 1, further comprising a frame for forming an outline of the holder case.

9. The battery pack of claim 1, wherein at least one of the batteries includes a secondary battery.

10. The battery pack of claim 1, wherein the first fin of the one of the ribs and the first fin of said another of the ribs, which directly contacts the first fin of the one of the ribs, contact the same battery of the plurality of batteries.

* * * * *